United States Patent
Qidwai et al.

(10) Patent No.: US 9,600,698 B2
(45) Date of Patent: Mar. 21, 2017

(54) BEHAVIOR-BASED SOURCE MONITORING SYSTEM AND METHOD THEREOF

(75) Inventors: Uvais Qidwai, Doha (QA); Adnan Abu-Dayya, Doha (QA); Osama Kubbar, Doha (QA)

(73) Assignee: QATAR UNIVERSITY QSTP-B, Doha (QA)

( * ) Notice: Subject to any disclaimer, the term of this patent is extended or adjusted under 35 U.S.C. 154(b) by 0 days.

(21) Appl. No.: 14/369,087

(22) PCT Filed: Feb. 7, 2012

(86) PCT No.: PCT/IB2012/050557
§ 371 (c)(1),
(2), (4) Date: Jun. 26, 2014

(87) PCT Pub. No.: WO2013/117962
PCT Pub. Date: Aug. 15, 2013

(65) Prior Publication Data
US 2014/0361878 A1    Dec. 11, 2014

(51) Int. Cl.
| | | |
|---|---|---|
| G06K 7/10 | (2006.01) |
| G01S 5/00 | (2006.01) |
| G01S 5/02 | (2010.01) |
| G08C 17/02 | (2006.01) |
| G08B 21/04 | (2006.01) |
| G08B 21/12 | (2006.01) |
| G08B 29/18 | (2006.01) |

(52) U.S. Cl.
CPC ........ *G06K 7/10366* (2013.01); *G01S 5/0009* (2013.01); *G01S 5/02* (2013.01); *G08C 17/02* (2013.01); *G08B 21/0423* (2013.01); *G08B 21/0453* (2013.01); *G08B 21/12* (2013.01); *G08B 29/188* (2013.01)

(58) Field of Classification Search
None
See application file for complete search history.

(56) References Cited

U.S. PATENT DOCUMENTS

| | | | |
|---|---|---|---|
| 2009/0206151 A1* | 8/2009 | Morita | G01S 5/0252 235/375 |
| 2010/0302041 A1 | 12/2010 | Malik et al. | |
| 2011/0037599 A1* | 2/2011 | Johnson, Jr. | H04W 4/043 340/632 |
| 2011/0093876 A1 | 4/2011 | Belz et al. | |

* cited by examiner

Primary Examiner — Daniell L Negron (57) ABSTRACT

Disclosed are systems and methods for behavior-based source monitoring to detect location of at least a source and gas leakage with a time stamp. The system comprises: at least a badge having a RFID tag and a gas sensor, the badge is capable of detecting leakage and location of the leakage of the gas, the badge is powered with rechargeable and permanent uninterrupted power back-up, at least a processing unit capable of processing at least a data packet, at least a source locator configured to at least locate a most confident center of an uncertain movement of a Radio Frequency Signal Indicator source readings, and at least a behavior characterization module capable of characterizing at least a behavior of the source. At least a RFID node is adapted for conveying at least a data packet received from the RFID badge to at least a computing device.

14 Claims, 12 Drawing Sheets

200 picking atleast a data packet emitted by atleast a RFID tag at atleast a RFID receiver node
210

↓ transferring atleast the data packet to atleast an application server
220

↓ isolating the packet information
230

↓ calculating atleast a trajectory parameter
210

↓ updating the trajectory parameter in a history database
220

↓ classifying the parameters into atleast a behavior category
230

FIG.7A
Output Variable "Abnormal"

Output Variable "Normal"
FIG.7B

FIG.7C
Output Variable "Critical"

BEHAVIOR-BASED SOURCE MONITORING SYSTEM AND METHOD THEREOF

FIELD OF THE INVENTION

The present invention relates generally to monitoring systems, and more particularly to systems and methods of behavior-based source monitoring to detect at least location of a source and gas leakage with a time stamp in a cost effective, secure, environmentally safe, and efficient manner.

BACKGROUND OF THE INVENTION

Personnel monitoring is being utilized in various installations, for example, oil and gas refineries, for security of the perimeter under monitoring, general security of the plant, and human personnel monitoring for accidents.

One common way of personnel monitoring that can be considered even by any layman is to place video cameras for surveillance. While this approach is being utilized in various installations, it still remains constrained with a number of shortcomings, e.g., initial cost of camera based network including wired or wireless infrastructure, need for constant operator-based operation, very expensive intelligent software is required if fully automated and yet the reliability is quite low, privacy issues, extremely difficult to re-locate/re-configure in case of wired system, very large bandwidth requirements for wireless operation.

RFID based inventory tracking has been in use in the industry for more than a decade now and has essentially become an important component of fast and reliable inventory control, tracking, and updates. However, the use of RFID for human personnel monitoring is quite new. Efforts have been made for the utilization of the RFID advance power through intelligent software applications for human personnel monitoring in a specific distress situations, such as, evacuations in order to identify the patterns in the movement so that appropriate measures can be taken to remove the shortcomings in the flow of the tracked movement. Similar attempts have been made to identify patterns in specific traffic or pedestrian movements in order to get trend information for better planning and development applications.

Often a time a human operator would enter an area of $H_2S$ leak and would not know of its presence due to odorless and colorless nature of the gas. This exposure not only could be fatal for that operator but could also be the starting point of a major leak. The existing personnel monitoring system fail to teach or suggest means for detecting $H_2S$ whose leakage is one of the prime interests to the Oil &Gas sector.

Despite the advances in RFID devices, the utilization of RFID advance power through intelligent software applications for performing behavior-based source monitoring or tracking remain unanswered because presently no system is available in the commercial market which is capable of overcoming above listed constraints and performing behavior-based source monitoring to detect location of the source and gas leakage with a time stamp without using the video.

Accordingly, in view of the disadvantages inherent in the conventional personal monitoring system, there exists a need for video-less personnel monitoring means capable of overcoming the disadvantages inherent in the existing personal monitoring system and providing effective system for behavior-based source monitoring being utilized in various installations including oil and gas refineries, for security of the perimeter under monitoring, general security of the plant, leakage of gas, and human personnel monitoring for accidents.

SUMMARY OF THE INVENTION

In view of the foregoing disadvantages inherent in the prior arts, the general purpose of the present invention is to provide an improved combination of convenience and utility, to include the advantages of the prior art, and to overcome the drawbacks inherent therein.

In one aspect, the present invention provides a system for behavior-based source monitoring to detect location of the source and gas leakage with a time stamp through higher level intelligence in movement of the source for optimal efficiency in a cost effective, secure, environmentally safe, and efficient manner.

In another aspect, the present invention provides a system for behavior-based source monitoring to detect location of at least a source and gas leakage with a time stamp. The system comprises at least a data processing unit capable of processing at least a data packet, at least a source locator configured to at least locate a most confident centre of an uncertain movement of Radio Frequency Signal Indicator source readings; and at least a behaviour characterization module capable of characterizing at least a behavior of the source. At least a RFID node is adapted for conveying at least a data packet received from the RFID badge to at least a computing device.

In another aspect of the present invention, the processing unit is capable of directing the incoming data stream to at least an appropriate sub-unit of an application module. The processing unit is capable of receiving at least a data packet and assign various processing steps in order to extract certain sets of information from the received data packet. The processing unit may be part of the application module. The processing unit is capable of performing at least one of the steps of filtering of data, locating the sources, timing calculation or any combination thereof. The step of data filtering further comprises the step of implying the removal of any noise or channel effects, providing cleaned data packet from at least the RFID node. The processing unit may use the location information and tally the location information with at least a Known Normal Behavior state diagram to indicate where is this source coming from currently.

In another aspect, the present invention provides a method for behavior-based source monitoring to detect location of at least a source and gas leakage with a time stamp. The method comprises the steps of picking at least a data packet emitted by at least a RFID tag at at least a RFID node, transferring at least the data packet to at least an application module, isolating the data packet information, calculating at least a trajectory parameter, updating the trajectory parameter in a history database, and classifying the parameters into at least a behavior category.

These together with other objects of the invention, along with the various features of novelty that characterize the invention, are pointed out with particularity in the claims annexed hereto and forming a part of this disclosure. For a better understanding of the invention, its operating advantages and the specific objects attained by its uses, reference should be had to the accompanying drawings and descriptive matter in which there are illustrated exemplary embodiments of the invention.

BRIEF DESCRIPTION OF THE DRAWINGS

While the specification concludes with claims that particularly point out and distinctly claim the invention, it is believed the expressly disclosed exemplary embodiments of the present invention can be understood from the following description taken in conjunction with the accompanying drawings, in which like reference numerals identify the same elements. The drawings and detailed description which follow are intended to be merely illustrative of the expressly disclosed exemplary embodiments and are not intended to limit the scope of the invention as set forth in the appended claims. In the drawings:

Like reference numerals refer to like parts throughout the several views of the drawings.

DETAILED DESCRIPTION OF THE DRAWINGS

The exemplary embodiments described herein detail for illustrative purposes are subject to many variations, structure and design. It should be emphasized, that the present invention is not limited to particular apparatus, system, device or methods for performing behavior-based source monitoring to detect location of the source and gas leakage with a time stamp without using the video, as shown and described. Rather, the principles of the present invention can be used with a variety of source monitoring methods and structural arrangements. It is understood that various omissions, substitutions of equivalents are contemplated as circumstances may suggest or render expedient, but the present invention is intended to cover the application or implementation without departing from the spirit or scope of the its claims.

In the following description, for purposes of explanation, numerous specific details are set forth in order to provide a thorough understanding of the present invention. It will be apparent, however, to one skilled in the art that the present invention may be practiced without these specific details.

As used herein, the term 'plurality' refers to the presence of more than one of the referenced item and the terms 'a', 'an', and 'at least' do not denote a limitation of quantity, but rather denote the presence of at least one of the referenced item. The term 'device' also includes 'engine' or 'machine' or 'system' or 'apparatus' and may also be used herein interchangeably.

The term 'source' includes at least one of personnel, a human operator, an object, a medium, a specific process, a work station, a process machine, a part of the process loop, a manual operation unit, a device or any combination thereof and may also be used herein interchangeably. The medium includes at least one of a solid medium, a liquid medium, and a gaseous medium. The part of the process loop may include valves and flow controllers.

The terms 'network module' and 'network subset' refer the same thing and may also be used herein interchangeably. The terms "application module', 'processing server application module', 'TCU Server application module', 'TCU server application subset, 'TCU application', and 'server application' refer the same thing and may also be used herein interchangeably.

The terms 'RFID nodes', 'RFID receivers', 'RFID receiver nodes', 'RFID stations', 'receivers', 'hybrid nodes', 'fixed nodes', 'RFID receiver unit', and 'receiver unit' refer the same thing and may also be used herein interchangeably. The terms 'RFID badge', 'RFID tag', "badge', and 'RFID badge transmitter' refer the same thing and may also be used herein interchangeably. The terms 'RFID data packet', 'RFID data', 'data packet', 'data', 'information', 'data stream', 'RFID data stream' and 'input data packet' refer the same thing and may also be used herein interchangeably.

The terms 'system' and 'behavior-based source monitoring system' refer the same thing and may also be used herein interchangeably. The terms 'method and 'behavior-based source monitoring method refer the same thing and may also be used herein interchangeably.

In an exemplary embodiment, the present invention provides systems and methods for automated surveillance and monitoring applications without having to deploy expensive video surveillance systems. The system of the present invention may be mass produced inexpensively and provides an easy, robust, efficient, secure, cost effective, environment friendly and productive way of automated surveillance and monitoring.

In an exemplary embodiment, the present invention provides a system for behavior-based source monitoring to detect location of the source and gas leakage with a time stamp through higher level intelligence in movement of the source for optimal efficiency in a cost effective, secure, environmentally safe, and efficient manner.

Figures 1, 2:
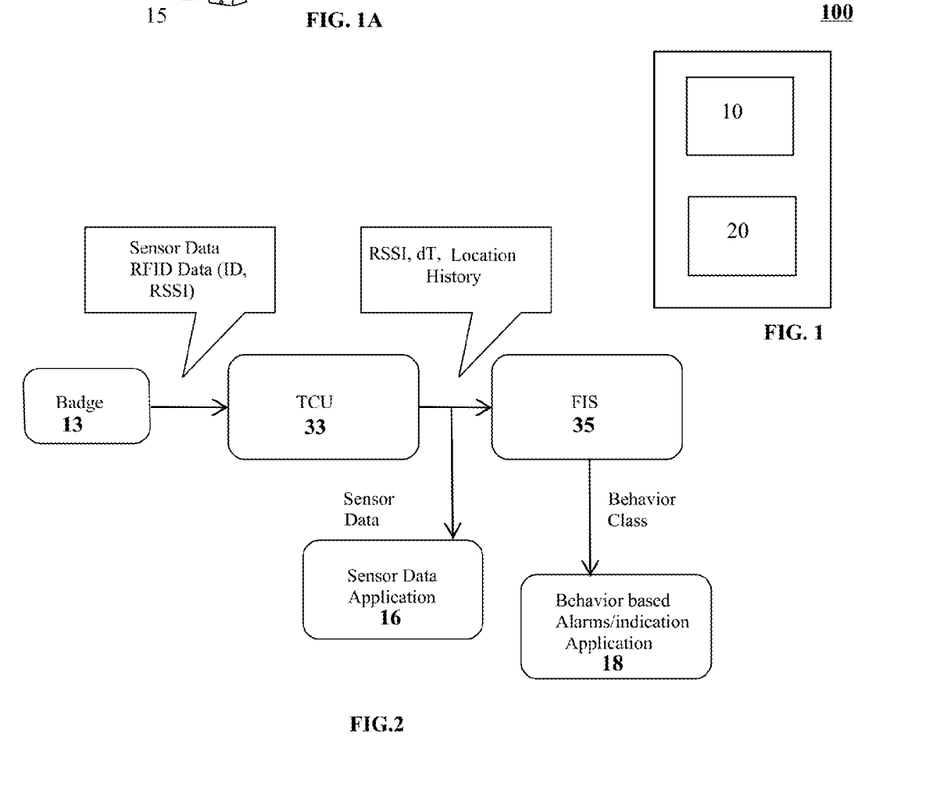
FIG. 1 illustrates a block diagram of a system for behavior-based source monitoring, according to an exemplary embodiment of the present invention.
FIG. 2 illustrates a signal logic flow for the scenario in FIG. 1A, according to an exemplary embodiment of the present invention.
Figure 1A:
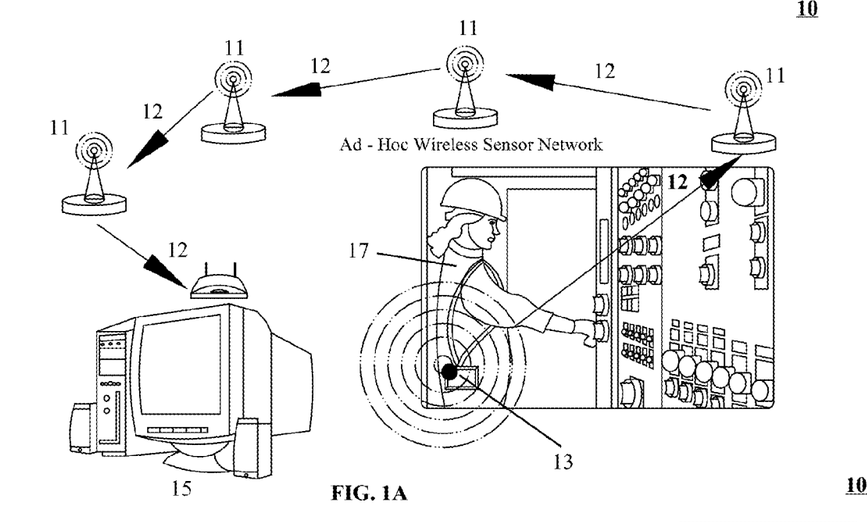
FIG. 1A illustrates an exemplary network module of the system for behavior-based source monitoring, according to an exemplary embodiment of the present invention.
Figure 1B:
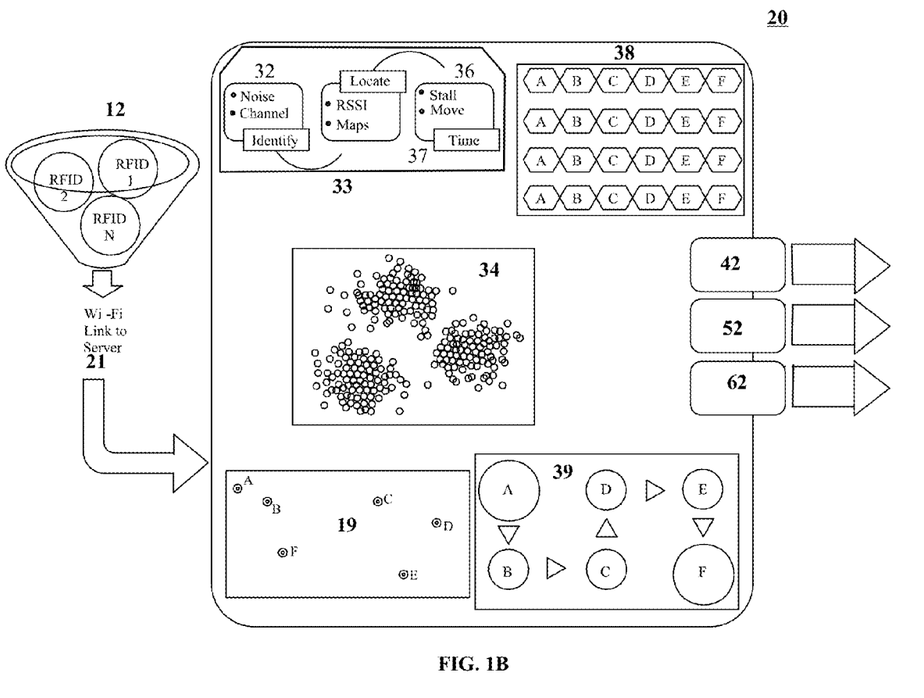
FIG. 1B illustrates an exemplary application module of the system for behavior-based source monitoring, according to an exemplary embodiment of the present invention.

Referring to FIG. 1 which is a block diagram of a system 100 for behavior-based source monitoring, according to an exemplary embodiment of the present invention. The system 100 comprises at least a network module 10 (as shown in FIG. 1A) and an application module 20 (as shown in FIG. 1B). The network module 10 includes a plurality of RFID nodes 11 communicably connected with at least a computing device 15 and at least a RFID badge 13. The RFID badge transmitter 13 may include a specialized RFID tag. The computing device 15 includes a base computer or any other device which is capable of at least securely and promptly processing, analysing, and storing information or data.

The source 17, for example, a human operator, may carry the specialized RFID badge 13 while on duty. The RFID badge 13 is capable of sending the required information, for example, the ID number and Radio Frequency Signal Indicator 42 (hereinafter referred to as 'RSSI') value, to at least one RFID node 11. The RFID nodes 11 are capable of conveying the information received from the RFID badge 13 to at least the computing device 15. The two types of devices, i.e., RFID nodes 11 RFID badge 13 may be customized through integration.

Often a time the source 17, for example, a human operator, would enter in an area of a gas leak, for example, $H_2S$ gas leak, and would not know of its presence due to odorless and colorless nature of the gas. Leakage of the $H_2S$ gas is one of the prime interests to the Oil and Gas sector because leakage of the $H_2S$ gas may not only be fatal for the human operator 17 but could also be the starting point of a major leak.

According to an exemplary embodiment of the present invention, the RFID badge 13 is not only helpful for authentication purposes, but it may also be complemented with other badges for specific applications. The RFID badge 13 may also incorporates at least a specialized gas sensor (not shown) capable of detecting leakage and location of the leakage of the gas, for example, $H_2S$ gas, so that the necessary measures can be taken to quickly stop the leakage of the gas and saving the gas, environment and plant from damage. The gas sensor may be packaged within the RFID badge 13 or may also be adapted separately.

Referring to FIG. 2 which illustrates logical flow of signals for the scenario of $H_2S$ gas leakage in FIG. 1A, according to an exemplary embodiment of the present invention. The burst of information that comes from the RFID badge 13 may comprises at least one of the RSSI 42, a Badge ID, a sensor data or any combination thereof, in the form of at least a data packet 12. This information may be captured by the RFID receivers 11 along with specialized sensor data receivers (not shown), if needed. In an exemplary embodiment, the sensor data receivers may also be embedded with the RFID data packets 12. The RFID data packet 12 includes at least one of a RSSI, ID, sensor data packets or any combination thereof.

The RFID nodes 11 that comprise of the bulk of the fixed network, are basically a hybrid node which is capable of receiving the gas sensor, for example, the $H_2S$ gas sensor, readouts as well as the RSSI 42 for each RFID badge 13 within its coverage area. The number of the hybrid nodes 11 may depend upon the area of coverage. The two quantities being received by the hybrid nodes 11 are RSSI 42 values and the customized data packets 12 from the $H_2S$ gas sensors. The RSSI 42 values may be read directly by the RFID receiver unit 11. The other side of the hybrid node 11 may have a WiFi backbone or WiFi network 21 (as shown in FIG. 1B) to transfer the data packets 12 to a processing unit. The processing unit may be the computing device 15 or any other application computer connected to the WiFi network 21 or may be a part of a processing unit 33.

The processing unit 33 may be configured for at least processing the data associated with the data packets 12. The processing of the data may include receiving the RFID data packets 12 and assign various processing steps in order to extract certain sets of information from the received data 12. The processing unit 33 may be part of the application module 20.

Referring to FIG. 1B which illustrates a block diagram of the application module 20, according to an exemplary embodiment of the present invention. The certain known points of interest 19 (also referred to as 'KM' or 'location tags' or 'KPI locations'), which are previously known, may be marked or indicated as A, B, C, D, . . . etc., on a map of the facility, plant or location. During the normal working routine, a certain type of activity is expected through the KPI 19. The connectivity of the locations of the source 17, superimposed on the location tags A, B, C, D, . . . etc., defines a specific behavior of the source 17 based on their Time of Stay (also referred to as 'ToS') on those locations. The behaviors of the source 17 are subjective to the location under surveillance and may be defined once in the beginning of the usage of the RFID tag 13.

The RFID data packets 12 may be received by the TCU server application module 20 through the Wi-Fi link 21. Each RFID data packet 12 may contains at least one of the personnel IDs and the respective RSSI 42 strengths received at a receiving station. Hence the input data packets 12 may be separated by the receiving station number as they 'funnel-in'. The processing unit 33 is a high-level abstraction of a dedicated data director whose main task is to direct the incoming data stream 12 to the appropriate sub-units in the application domain.

According to an exemplary embodiment of the present invention, before directing the RFID data 12, received through the Wi-Fi network 21, to any other sub-units, the processing unit 33 is capable of performing at least one of the steps of: filtering of the RFID data 12, locating at least the source 17, timing calculation or any combination thereof.

The data filtering may include the step of implying the removal of any noise or channel effects 32 to obtain cleaned data packet 12 from the RFID receiving station 11. The step of data filtering may or may not be needed depending upon the Wi-Fi reception hardware wherein sometimes these capabilities are built-in. The end result of this processing step is a cleaned data packet 12 from one RFID receiving station 11. The step of data filtering may also be repeated for all the incoming data packets 12 from various RFID receiving stations 11.

Figure 3A:
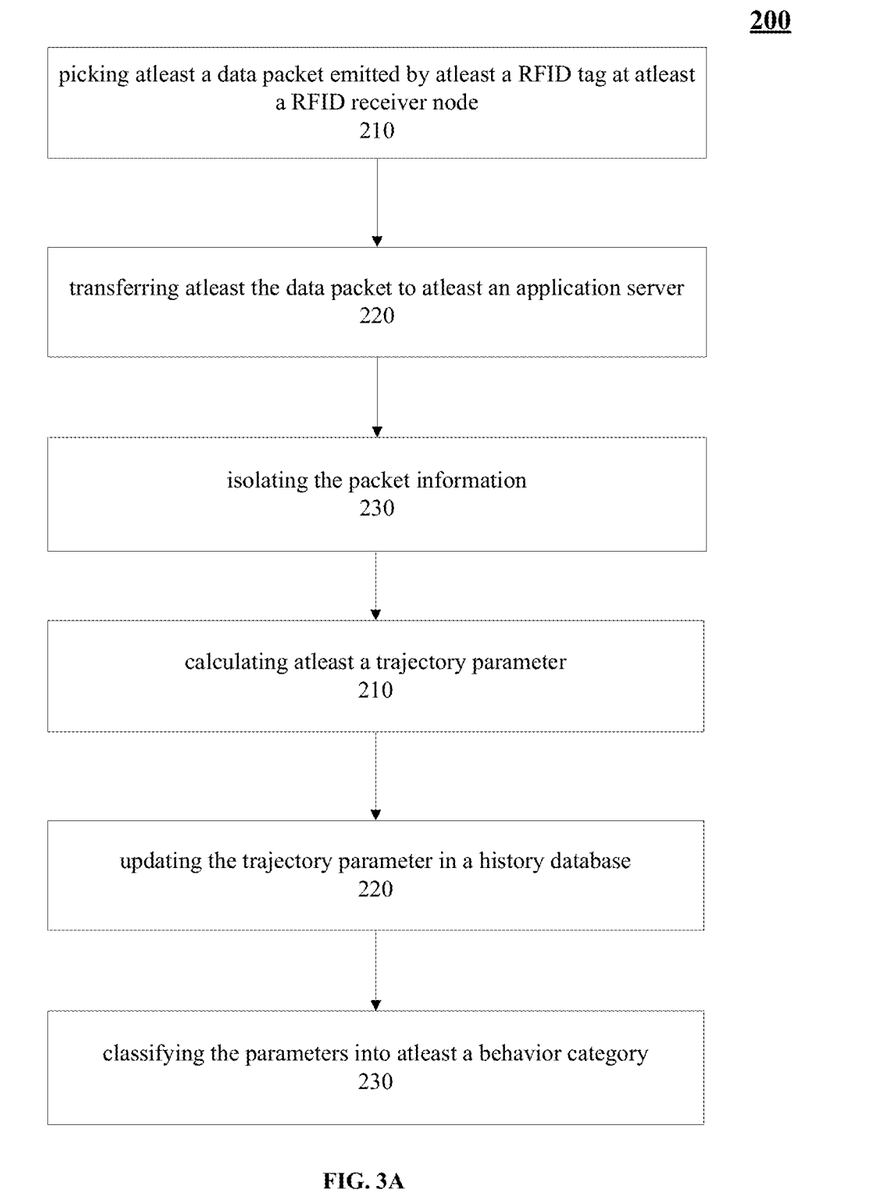
FIGS. 3A and 3B illustrate flow-graphs of a method for behavior-based source monitoring, according to an exemplary embodiment of the present invention.
Figure 3B:
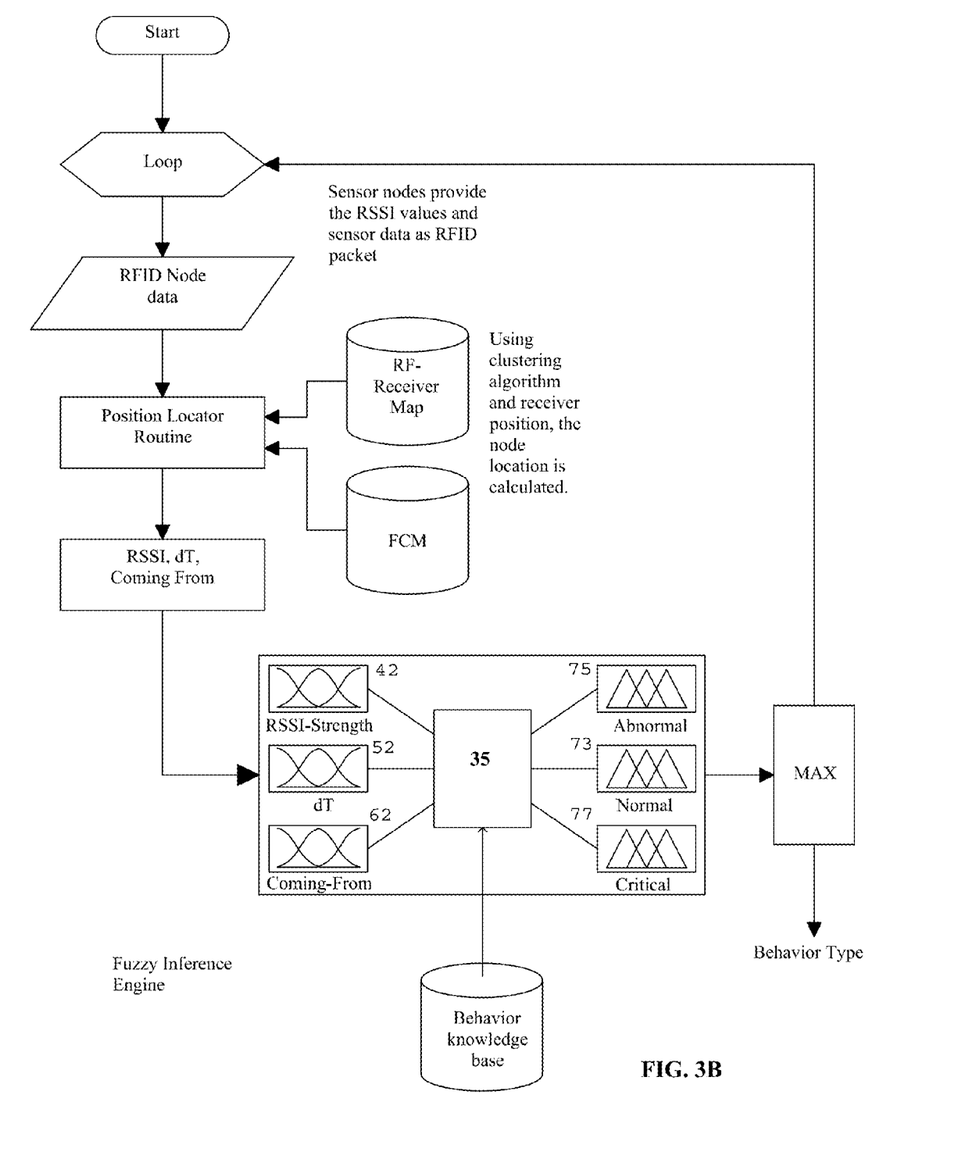

Referring to FIGS. 3A and 3B which illustrate flowgraphs of a method 200 for behavior-based source monitoring, according to an exemplary embodiment of the present invention. The method 200 comprises the steps of: picking at least a data packet 12 emitted by at least a RFID tag 13 at at least a RFID receiver node 11 at a step 210; transferring at least the data packet 12 to at least an application module 20 at a step 220; isolating the packet information at a step 230; calculating at least a trajectory parameter at a step 240; updating the trajectory parameter in a history database at a step 250; and classifying the parameters into at least a behavior category at a step 250. The RFID receiver nodes 11 transfer the data packets 12 to the application module 20. The application module 20 may isolates the packet information into at least one of the ID, RSSI 42 value, sensor data or any combination thereof. The ID is separated for the RFID tag 13 carrier identification. The RSSI 42 values are separated and are mapped into the location map for locating the person. Any accompanying sensor data is transferred to its own specific application. By using the separated RSSI 42 values mapped into the location map for locating the person, the trajectory parameters, for example, dT 52, RSSI 42 value, and 'Coming from' values, are calculated and updated in the history database. The calculated parameters are given to the FIS 35 which uses the application-specific heuristic rules to classify the parameters into a behavior category.

Figure 4:
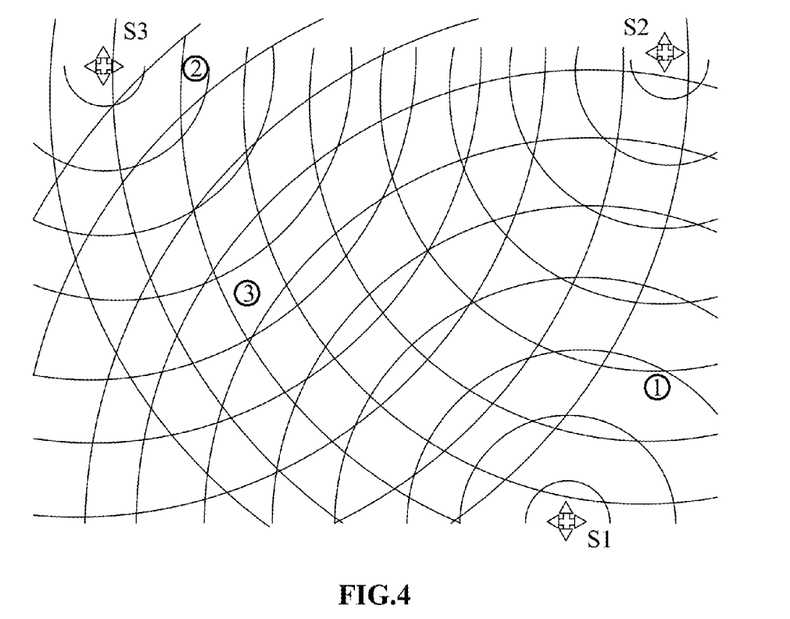
FIG. 4 Illustrates an explanation of the source location scenario during one typical tracking run, according to an exemplary embodiment of the present invention.

Referring to FIG. 4 which illustrates the source 17 location scenario during one typical tracking run, according an exemplary embodiment of the present invention. The source 17 may be at least one of the sources S1, S2, S3, .... At least one of the sources S1, S2, S3, ... may be located by using the Known Points of Interest Maps 19 (also referred to as 'KPI Maps') which is a pre-defined set off coordinates of the KPI 19 in a particular location, aspect or a problem at hand, for example, in an oil and gas refinery setting, each KPI 19, i.e., KPI locations A, B, C, D, ... etc., may be a specific process station or process machine or a part of the process loop such as valves, flow controllers, and manual operation units. This set of coordinates, along with the set of coordinates of the RFID receiver 11 positions in the field are correlated together based on the RSSI 42 strength for the source S1 compared to the source S2 or the source S3 and may provide a larger value of RSSI 42 at the source S1 while a lower value at the source S2 and even lower for the source S3. A simple comparison of RSSI 42 for the same ID for different RFID receivers 11 for a given time slot may easily locate any of the appropriate source S1, S2, S3 ..., i.e., the personnel 17.

Figure 5:
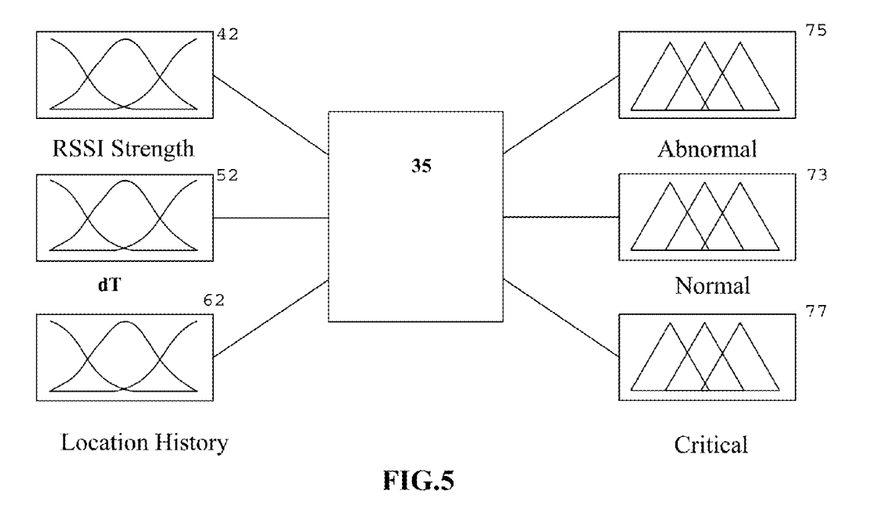
FIG. 5 Illustrates a behavior characterization module, according to an exemplary embodiment of the present invention.

In an embodiment, one additional aspect of locating any of the sources S1, S2, S3, ... is in perspective of its previous position. The processing unit 33 may uses the location information and tally it with the Known Normal Behavior 39 (also referred to as 'KNB') state diagrams to indicate where is this source coming from currently. This piece of information may be used by a behavior characterization module 35 (as shown in FIG. 5 to decide upon the characterization of the behavior type.

Based on the location of at least one of the sources S1, S2, S3, ..., the succeeding RFID data packets 12 may be used to determine at least one of a 'stalling' or a 'moving' trajectory/behavior 36 of at least one of the sources S1, S2, S3, ..., within a predefined vicinity. The vicinity may be appropriately selected, for example, ±2 meters from the centre of the KPI locations A, B, C, D, ... etc. The timing maps 38 thus calculated may be handed over to a ToS calculation sub-unit 38.

According to an exemplary embodiment of the present invention, at least a sensor application unit 16 (as shown in FIG. 2) is adapted to send out the sensor data transparently from the application module 20 which may be used by any situation specific application. The sensor application unit 16 may be as simple as just displaying the sensor data for a location or for a personnel ID, or it may be extended to more complex applications such as building a whole environment map for the sensor data for a number of locations.

According to an exemplary embodiment of the present invention at least an alarm management application 18 (as shown in FIG. 2) may be adapted. Once the state of the behavior of the personnel 17 is classified as Normal 73, Abnormal 75, or Critical 77 (as shown in FIG. 5), appropriate indications may be provided as part of the alarm management application 18 which may produce different colors or sound effects for the three classes of behavior, ie., Normal 73, Abnormal 75 or Critical 75.

According to an exemplary embodiment of the present invention, a source locator 34 is adapted to at least locate the most confident centre of the uncertain movement of the RSSI 42 source readings. The source locator 34 may include a Fuzzy C-Mean Clustering based Source Locator (also referred to as 'FCMSL' or 'FCMSL unit'). Although a lot of data filtering is performed at the processing unit 33 level, however, the RSSI 42 values may keep swinging a lot around a logical central value. This may be primarily due to the various reflections of the radio waves and creation of multiple interference patterns thereof. The FCMSL unit 34 may be implemented in this scenario as well in order to locate the most confident centre of the uncertain movement of the RSSI 42 source readings. The processing unit 33 may utilize the FCMSL unit 34 after predefined number of readings, for example, every ten readings, from one RFID receiving station 11. The tenth reading number may be an ad-hoc and may be made to change depending upon the level of activity. Essentially, a dynamic factor may be designed as a function of RSSI 42 and signal to noise ratio at at least one of the KPI A, B, C, D, ... etc., of the KPI Map 19 to set this threshold according to the level of RSSI 42 activity in the vicinity of interest.

The ToS unit 38 is capable of correlating its behavior with the predefined KNB 39 map which is a state diagram representing the logical flow of at least one of the sources S1, S2, S3, ... in terms of its stalling and/or moving behaviors 36. Essentially, this makes the ToS unit 38 a timing diagram that tracks the stop-overtime for at least one of the sources S1, S2, S3 at each KPI A, B, C, D, ... etc.

According to an exemplary embodiment of the present invention, an output of ToS unit 38 may be used in at least a manner including but not limiting to: an absolute stop-over behavior of any of the sources S1, S2, S3, ... at at least one of the specific KPI A, B, C, D, ... etc, which in turn becomes an integral part of the overall behavior under observation; and detection of any emergency situation, for example, an accidental exposure of the personnel 17 to $H_2S$ or similar toxic gas causing the personnel 17 to fall on the ground rendering no motion activity at one of the specific KPI A, B, C, D, ... etc, or on the way to it. While there are Gas indicators everywhere, there are several cases in the industry where slow leaks are passed by un-noticed and the human operator 17 may keep inhaling the toxin slowly and ultimately collapse. Such situations are immediately reported in the system 100 of the present invention as an Emergency indication for immediate action.

According to an exemplary embodiment of the present invention, at least a sensor application unit 16 (as shown in FIG. 2) is adapted to send out the sensor data transparently from the application module 20 which may be used by any situation specific application. The sensor application unit 16 may be as simple as just displaying the sensor data for a location or for a personnel ID, or it may be extended to more complex applications such as building a whole environment map for the sensor data for a number of locations.

According to an exemplary embodiment of the present invention at least an alarm management application 18 (as shown in FIG. 2) may be adapted. Once the state of the behavior of the personnel 17 is classified as Normal 73, Abnormal 75, or Critical 77 (as shown in FIG. 5), appropriate indications may be provided as part of the alarm management application 18 which may produce different colors or sound effects for the three classes of behavior, ie., Normal 73, Abnormal 75 or Critical 75.

Referring to FIG. 5 which illustrates a behavior characterization module 35, according an exemplary embodiment of the present invention. Based on the received data packets 12, the behavior characterization module 35 is capable of evaluating and characterizing behavior of the source 17.

Figure 6A:
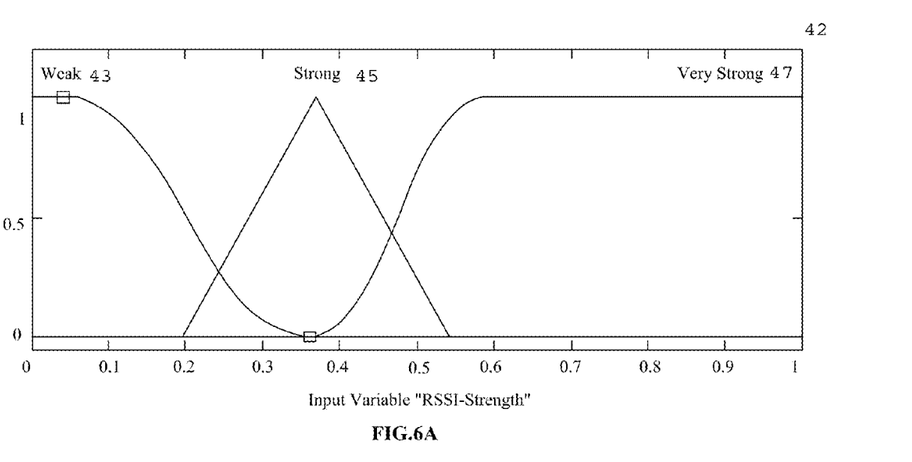
FIG. 6 illustrates input membership functions, according to an exemplary embodiment of the present invention.
Figure 6B:
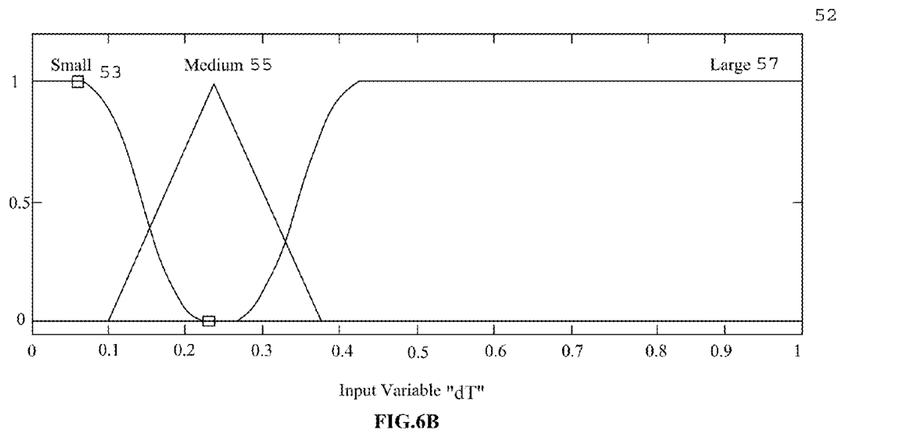
Figure 6C:
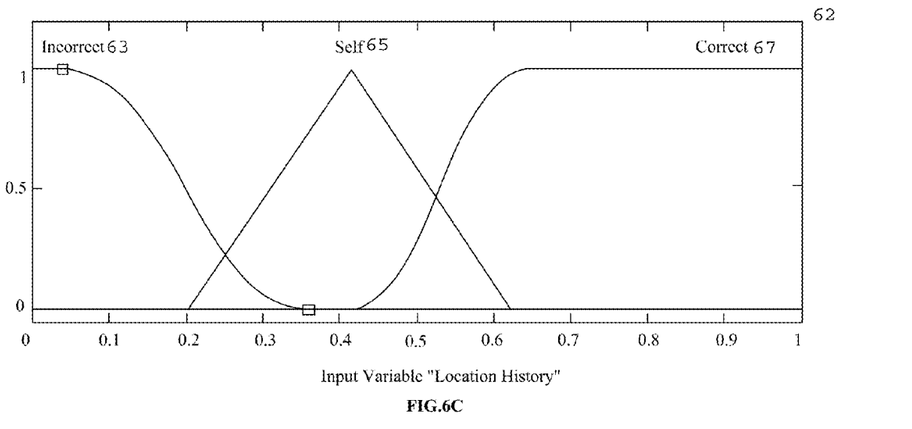

Referring to FIGS. 6A to 6C which illustrate various memberships in each input parameter, i.e., input membership functions, according an exemplary embodiment of the present invention. The FIG. 6A illustrates input variable RSSI 42 Strength as weak 43, strong 45, and very strong 47 with memberships. FIG. 6B illustrates input variable dT 52 as small 53, medium 55, and large 57 with the memberships. The FIG. 6C illustrates input variable Location History 62 as incorrect 63 and self 65, and correct 65 with memberships. Three outputs (as shown in FIG. 1B), also known as FIS 35 variables, obtained from the processing unit 33 and its related sub-systems include Strength of the source at present location, i.e., RSSI 42, time spent in the vicinity of this location 52 (also referred to as 'dT'), and the indication of where is it coming from, i.e., location history 62. These parameters, i.e., the RSSI 42, the dT 52, and the location history 62 may constitute the three input parameters to the FIS 35.

According to an exemplary set of general rules observed in selecting the types and thresholds of the membership functions, for example, the RSSI 42, the dT 52, and the location history 62, initial membership function may be based on z-function which may covers entire search space from −∞ to the known values that may put this parameter into a sub-normal range; final membership function may be based on s-function which may covers entire search space from the known values that may be put this parameter just above the normal range to +∞; and the middle one may be the connecting membership function for the initial membership function and the final membership function as a triangular function.

The values of the ranges of these exemplary membership functions may be based on the logical understanding and probable demarcation points that may be used in defining the ranges for each membership. As, in the FIS 35 setting, exact knowledge is not required accordingly, the method of deduction may be adapted for the processed data parameters. The membership functions may be experimented with to have different shapes as well instead of the z, s, and triangular functions. However, this has been observed from experience with many different domains that the shape may be of concern only when the data distribution is quite peculiar. For instance, the parameter dT 52 in the above scheme may be high for critically abnormal cases 75 and hence may be covered with a large variance function such as the z or the s function, while the one for normal time spent at any one of a KPI A, B, C, D, . . . etc., may be covered by a low variance function such a triangular or Gaussian functions. The same reason may be applied to the other parameters as well.

Figure 7A:
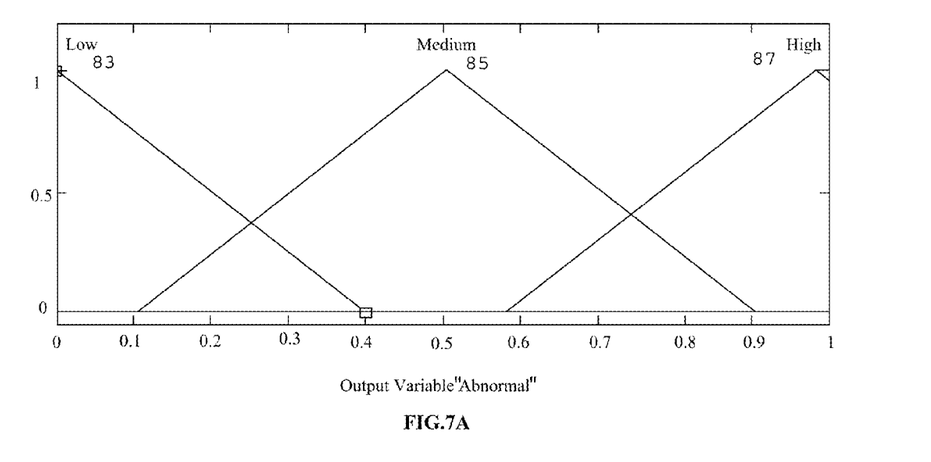
FIGS. 7A to 7C illustrate an output membership functions, according to an exemplary embodiment of the present invention.
Figure 7B:
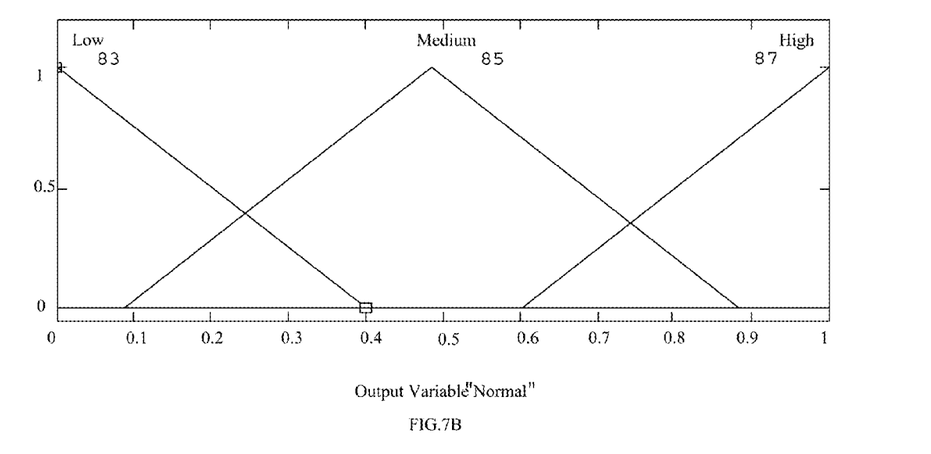
Figure 7C:
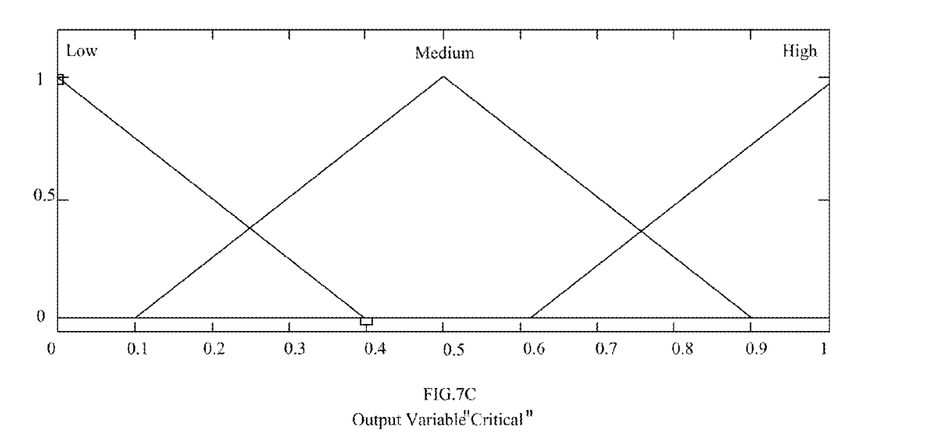

Referring to FIGS. 7A to 7C which illustrate an output membership functions, according to an exemplary embodiment of the present invention. A plurality of output membership functions (also referred to as 'output variables') may represent three classes which may be selected to have uniform triangular distributions for the three output classes representing output variable Abnormal 85 (as shown in FIG. 7A), output variable Normal 83 (as shown in FIG. 7B), and output variable Critical 87 (as shown in FIG. 7A) situations. While Normal behavior 83 corresponds to the KNB 39 states and the allocated timings therein, abnormal behavior 85 may be anything other than that. Critical situation 87 may be a separate class to handle emergency situations such as exposure to the $H_2S$, person 17 falling down, becoming unconscious, etc. In each of these cases, the memberships are equally distributed groups of Low 82, Medium 84, High 86 membership ordinals.

According to an exemplary embodiment of the present invention, a set of rules (also referred to as "rule base') may be based upon how a human operator would understand given the behaviors for various monitoring scenarios. The set of rules may be adapted to operate well in diagnosing Critical 77 and Normal 73 behaviors. The rules may include but not limited to: if (RSSI 42 Strength is Very-Strong 47) and (dT 52 is Large 57) and (Location-History 62 is Correct 67) then (Normal 73 is High); if (RSSI 42 Strength is Very-Strong 47) and (dT 52 is Small 53) and (Location-History 62 is Self 65) then (Normal 73 is Medium 55) (Critical 77 is Low 83); if (RSSI 42 Strength is Very-Strong 47) and (dT 52 is Medium 55) and (Location-History 62 is Incorrect 63) then (Abnormal 75 is High 87); if (RSSI 42 Strength is Very-Strong 47) and (dT 52 is Large 57) and (Location-History 62 is Incorrect 63) then (Abnormal 75 is Low 83)(Critical 77 is High 87).

These rules may be more directed to detect the abnormality at a specific KPI. Hence the RSSI 42 strength may be only considered for Very-Strong 47 membership is used. This may be modified if the emphasis is to other type of behavior detection is sought.

Figure 8A:
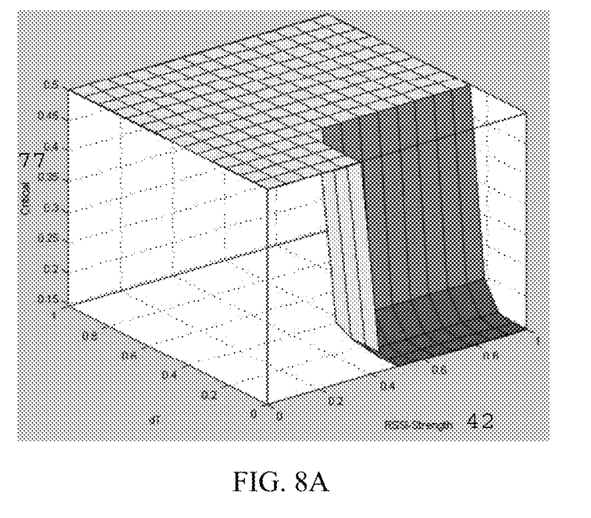
FIGS. 8A to 8D illustrate decision surfaces, according to an exemplary embodiment of the present invention.
Figure 8B:
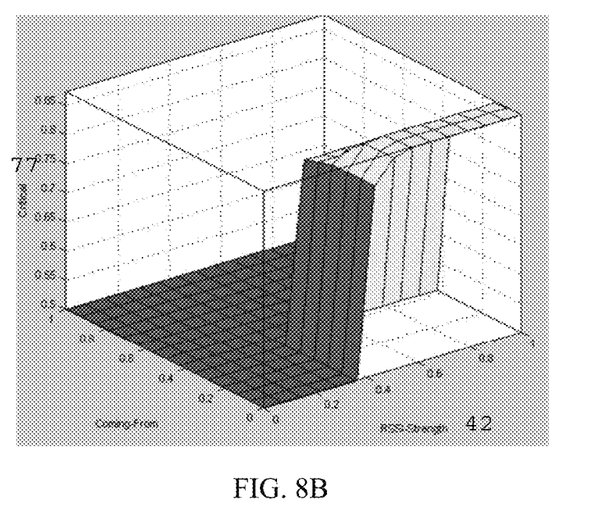
Figure 8C:
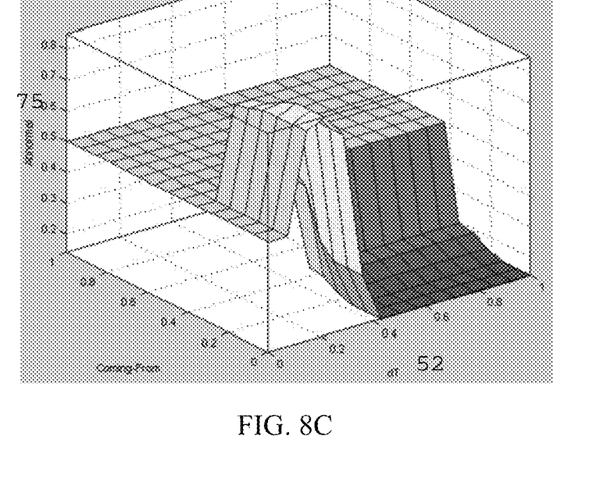
Figure 8D:
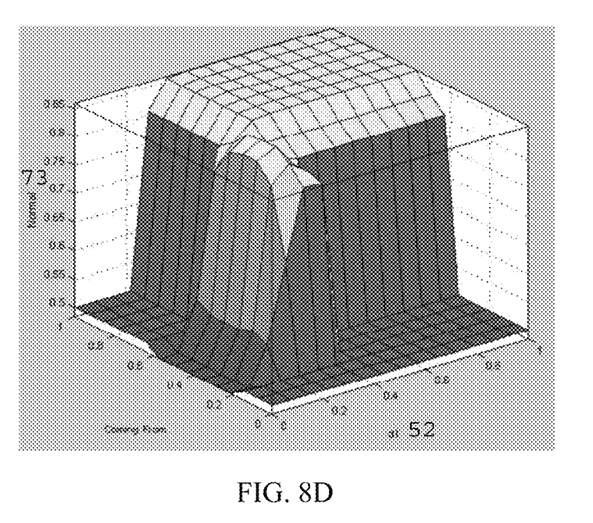

Referring to FIGS. 8A to 8D which illustrate decision surfaces, according to an exemplary embodiment of the present invention. FIG. 8A illustrates exemplary Critical output 77 with the dT 52 and the RSSI 42 Strength. FIG. 8A illustrates exemplary critical output 77 with Coming-From and RSSI 42 Strength. FIG. 8C illustrates exemplary Abnormal output 75 with Coming-From and dT 52. FIG. 8D illustrates exemplary Normal output 37 with Coming-From and dT 52. Once all the implications of the rules are established for a given input set, then an overall decision surface may be adapted whose centroid may provide a quantitative output measure for that output class. The centroid thresholds for each output class may then be compared to decide in favor of the highest value as the dominant behavior class.

Figure 9A:
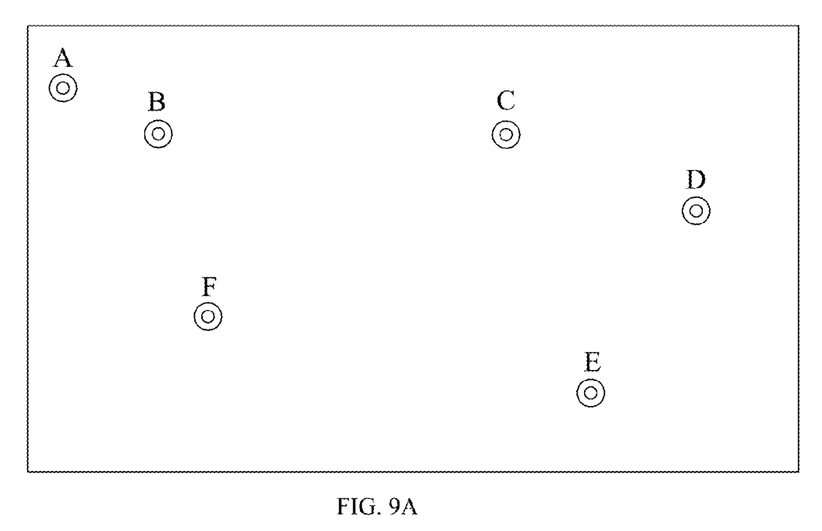
FIGS. 9A and 9B experimental settings with indicated locations of the RFID receivers, according to an exemplary embodiment of the present invention.
Figure 9B:
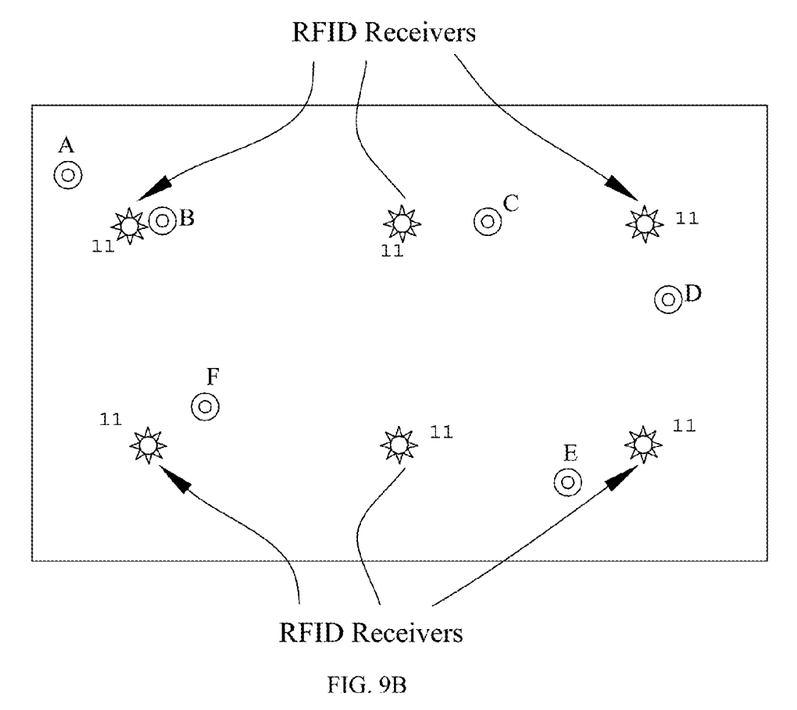

Referring to FIGS. 9A and 9B which illustrate an exemplary testing scenario with indicated locations of the RFID receivers 11. The sample testing scenario may be setup for simulation of the RFID behavior. Locations A through F (FIG. 9A) are the KPIs 19 representing certain process stations in a refinery setting. In order to cover the whole area more completely for RFID coverage, there are six RFID receivers 11 placed in the same area as indicated in FIG. 9B (KPI 19 with indicated locations of the RFID receivers 11).

A normal behavior 73 may be defined as a specific movement from location A to B to C to D to E and then to F each with a stalling duration of 3-5 minutes at the station.

Figure 10A:
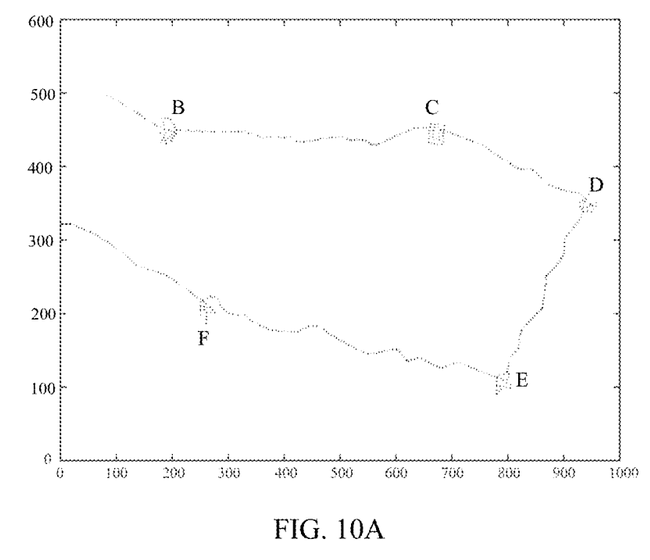
FIGS. 10A and 10B illustrate a predefined normal behavior, on the KPI locations, according to an exemplary embodiment of the present invention.
Figure 10B:
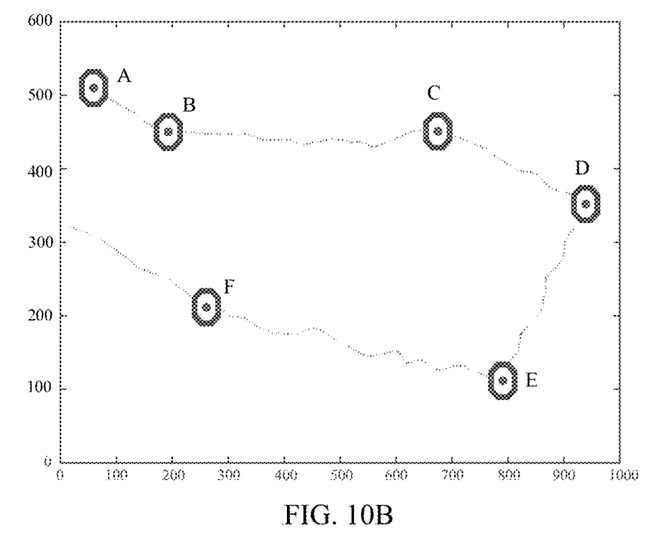

Referring to FIGS. 10A and 10B illustrate the actual Normal movement or predefined normal behavior of the personnel 17 along with the superimposed locations of the KPIs 19. A plot of actual RFID readouts is illustrated in FIG. 10A, and a plot of actual RFID readouts superimposed on the KPI locations 19.

Figure 11A:
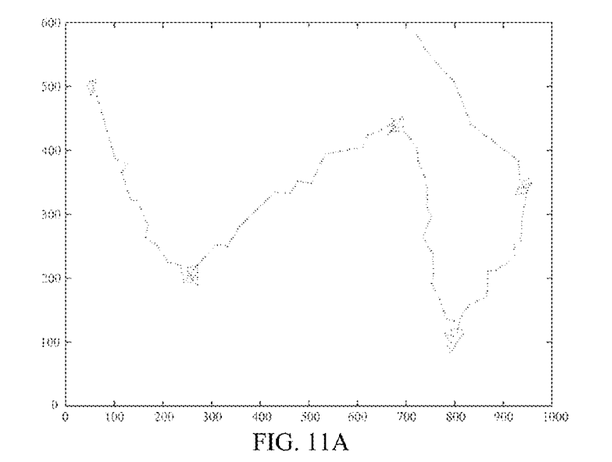
FIGS. 11A to 11C illustrate exemplary abnormal behaviors, according to an exemplary embodiment of the present invention.
Figure 11B:
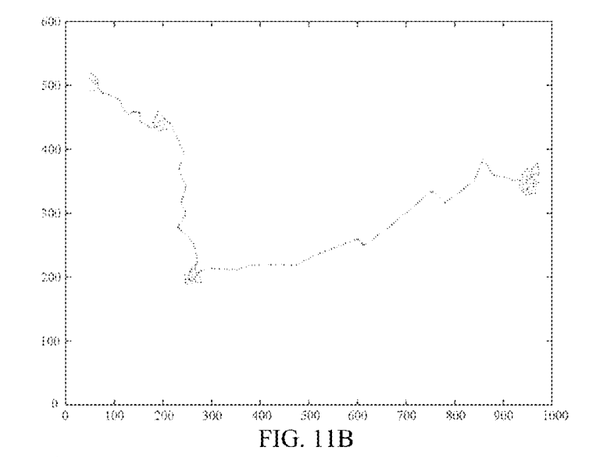
Figure 11C:
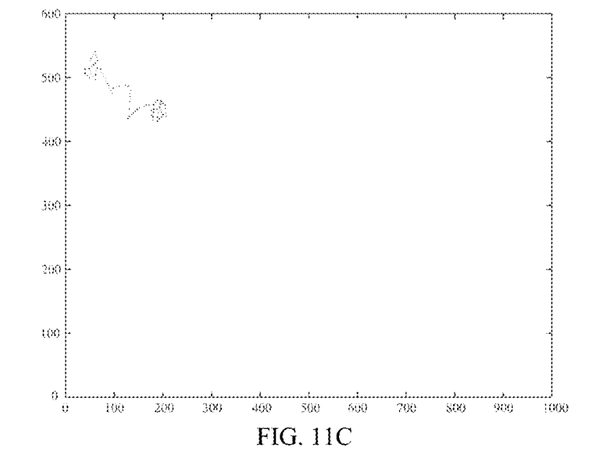

Referring to FIGS. 11A to 11C which illustrate the abnormal behaviors 75 tested with the scheme including wrong sequences (FIG. 11A), sorter sequence (FIG. 11B) and emergency/critical 77 stall at a KPI 19 (FIG. 11C).

The Table 1 shows the typical values of the FIS 35 outputs for various behaviors at different KPIs 19 references. In all cases, the behavior class may be correctly identified.

TABLE 1

| Behavior Data | Ab-Normal 75 | Normal 73 | Critical 77 |
| --- | --- | --- | --- |
| FIG. 10A | 0.5 | 0.867 | 0.751 |
| FIG. 11A | 0.876 | 0.623 | 0.500 |
| FIG. 11B | 0.879 | 0.754 | 0.500 |
| FIG. 11C | 0.754 | 0.500 | 0.876 |

The typical FIS 35 results at the most significant RFID receiver 11 for that behavior point. In each row, the selected class of output is the maximum value of the three output centroids.

According to an exemplary embodiment, the present invention is capable of utilizing RFID location data with the FIS 35 and heuristic data correlation for the classification of various types of behaviors of human personnel 47 in a typical oil & gas industry settings. The exemplary strategies are fairly straight forward and are implementable quite transparently to any application domain with similar constraints and scenarios. Many benefits may be obtained by using the system 100 of the present invention. Compared to any wireless networks, RFID data 12 are more robust since they are usually short messages with sufficient redundancy of transmission to overcome the noisy environment in the industrial settings. Respective RFID receiver node 11 may also enable a base station interface to locate the personnel 17 in various places. The system 100 may produces very small RFID data packets 12 compared to video data streams for surveillance.

According to an exemplary embodiment, a behavior-based understanding of the location maps may enable the determination of risk-related situations. In order to change the topology, or a modification in deployment, as well as an entirely new deployment, minimal initializations are needed in the hardware infrastructure. The sensor-communication nodes may be integrated in an existing WiFi network 21 quite naturally thus enabling an extension to the functionality of the existing infrastructure.

According to an exemplary embodiment, in addition to personnel monitoring for the hazardous areas in oil and gas settings, the present invention may also be transparently applied to a number of industrial applications, for example, patient monitoring for extremely sick or dependent patients where their behavior can trigger an alarm for the physician or the care-taker; inventory monitoring for a variety of products in a range of processing/supply steps for detecting their normal flow; surveillance of a specific area using a number of RFID agents (similar to a swarm of robots) for a number of industrial applications, including oil rig inspections, process parameter monitoring at a number of points in a refinery settings, etc.; oil rig personnel monitoring for personnel identification as well as detection of any entry/exit as well as any accidents on the rig.

According to an exemplary embodiment of the present invention, the RFID sensors used may be any of active and passive type. The RFID badges 13 may be powered with rechargeable and permanent uninterrupted power back-up for their proper operation. The power-back-up may include solar power, electrical power, wind power, nuclear power, and induced power. Any compact sensor may be embedded with the RFID badge 13. Further, many of the gas sensors, other application dependent sensors, and other commercially available sensing devices may be used with the system 100. A known set of behaviors in the Fuzzy sense may be adapted for transparent migration to a new application.

According to an exemplary embodiment of the present invention, the system 100 is capable of localizing the badge-wearer or the source/personnel 17 and to detect the behavior of the personnel 17 based on the locations and time. The embedded sensor system may provide a transparent methodology to transfer other quantities of interest to the application server. Hence, depending upon the type environment and the parameter of interest to be sensed, different sensor attachments may be used with the badge system.

According to an exemplary embodiment of the present invention, a specific application scenario, related to oil and gas process industry is used and a hybrid of mobile techniques with human personnel tracking is used. Such a system is very beneficial since it combines the robotic precision with human social and psychological factors into a workable solution. The RFID sources including the active personnel badges that can transmit the ID and the RSSI 42 through a repeated manner of transmission.

In various exemplary embodiments of the present invention, the operations discussed herein, e.g., with reference to FIGS. 1 to 11C, may be implemented through computing devices such as hardware, software, firmware, or combinations thereof, which may be provided as a computer program product, e.g., including a machine-readable or computer-readable medium having stored thereon instructions or software procedures used to program a computer to perform a process discussed herein. The machine-readable medium may include a storage device. For example, the operation of components of the system 100 and method 200 may be controlled by such machine-readable medium.

In other instances, well-known methods, procedures, components, and circuits have not been described herein so as not to obscure the particular embodiments of the present invention. Further, various aspects of embodiments of the present invention may be performed using various means, such as integrated semiconductor circuits, computer-readable instructions organized into one or more programs, or some combination of hardware and software.

Although a particular exemplary embodiment of the invention has been disclosed in detail for illustrative purposes, it will be recognized to those skilled in the art that variations or modifications of the disclosed invention, including the rearrangement in the configurations of the parts, changes in sizes and dimensions, variances in terms of shape may be possible. Accordingly, the invention is intended to embrace all such alternatives, modifications and variations as may fall within the spirit and scope of the present invention.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is understood that various omissions, substitutions of equivalents are contemplated as circumstance may suggest or render expedient, but is intended to cover the application or implementation without departing from the spirit or scope of the claims of the present invention.

What is claimed is:

1. A system for behavior-based monitoring to detect location of at least a source with a time stamp, comprising:
    at least a RFID badge having a RFID tag and a gas sensor, the RFID badge is capable of detecting a gas leakage and a location of the gas leakage, the RFID badge is powered with a power back-up, wherein the power back-up includes one of solar power, electrical power, wind power, nuclear power, and induced power;
    at least a processing unit capable of processing at least a data associated with at least a data packet;
    at least a source locator configured to at least locate a most confident center of an uncertain movement of a Radio Frequency Signal Indicator source readings; and
    a behavior characterization module capable of characterizing at least a behavior of the source;

wherein at least a RFID node is adapted for conveying at least a data packet received from the RFID badge to at least a computing device, wherein the RFID badge is capable of sending at least one of an ID number and a Radio Frequency Signal Indicator value to at least the RFID node, wherein connectivity of at least one of a particular location of the source and a specific behavior of the source based on time of stay of the source at the particular location is superimposed on at least a known point of interest, wherein the specific behavior includes at least one of a normal, an abnormal, a critical or any combination thereof.

2. The system of the claim 1, wherein the RFID badge comprising at least one of the Radio Frequency Signal Indicator, a Badge ID, a sensor data or any combination thereof in the form of the data packet.

3. The system of the claim 1, wherein the RFID node is capable of receiving at least one of the gas sensor readouts, data packets, the Radio Frequency Signal Indicator source readings or any combination thereof for each RFID badge.

4. The system of the claim 1, wherein the RFID node having at least a wireless data transmission unit to transfer the data to the computing device.

5. The system of the claim 1, wherein based on the location of at least the source a plurality of succeeding data packets are used to determine at least one of a stalling and a moving trajectory of at least the source within a predefined vicinity.

6. The system of the claim 1, wherein at least a dynamic factor is adapted as a function of the Radio Frequency Signal Indicator and signal to noise ratio at at least one of the Known points of Interest.

7. The system of the claim 1, wherein at least a Time of Stay unit is capable of performing at least one of tracking a stop-over time for at least the sources at each Known Point of Interest, correlating behavior of the source with a predefined Known Normal Behavior map, absolute stop-over behavior of the source at least one of the specific Known Point of Interest, detection of any emergency situation or any combination thereof.

8. The system of the claim 1, wherein at least a sensor application unit is adapted to send out at least a sensor data.

9. The system of the claim 1, wherein at least an alarm management application is adapted to produce at least an indication based on behavior of the source.

10. The system of the claim 1, wherein at least an overall decision surface is adapted to provides a quantitative output measure for an output class.

11. A method for behavior-based source monitoring, comprising the steps of:
picking at least a data packet emitted by at least a RFID tag;
tracking a stop-over time for at least a source;
transferring at least the data packet to at least an application module;
isolating information associated with the data packet into at least one of an ID, a Radio Frequency Signal Indicator value, a sensor data;
calculating at least a trajectory parameter;
updating the trajectory parameter in a history database; and
classifying the trajectory parameters into at least a behavior category,
wherein a RFID badge having a gas sensor and the RFID tag and is capable of detecting a gas leakage and a location of the gas leakage with a time stamp,
wherein the RFID badge is capable of sending at least one of the ID number and the Radio Frequency Signal Indicator value to at least a RFID node.

12. The method of the claim 11, wherein a processing unit is capable of performing at least one of filtering at least a data, locating at least the source, calculating at least a timing map or any combination thereof.

13. The method of the claim 11, wherein the step of filtering of the data further comprising the step of implying the removal of any noise or channel effects and providing cleaned data packet from at least the RFID node.

14. The method of the claim 11, wherein the processing unit is configured to perform at least one of receiving at least an incoming data packet, assigning at least a plurality of processing step for extracting certain sets of information from the received data packet, directing the incoming data packet or any combination thereof.

* * * * *